United States Patent [19]

Mellor et al.

[11] 4,076,512

[45] Feb. 28, 1978

[54] CONTROLLED METHOD FOR THE PRODUCTION OF CLAD GLASS ROD

[75] Inventors: James Robert Mellor, Ormskirk; Colin Billington, Burscough, both of England

[73] Assignee: Pilkington Brothers Limited, St. Helens, England

[21] Appl. No.: 721,924

[22] Filed: Sep. 9, 1976

[30] Foreign Application Priority Data

Sep. 15, 1975 United Kingdom ............... 37831/75

[51] Int. Cl.² ........................................... C03B 15/16
[52] U.S. Cl. ........................................ 65/29; 65/85; 65/162; 65/163; 65/DIG. 13
[58] Field of Search ................... 65/3 A, 84, 85, 162, 65/163, 29, DIG. 13; 428/392

[56] References Cited

U.S. PATENT DOCUMENTS

| 2,150,017 | 3/1939 | Barnard | 65/163 X |
| 3,471,278 | 10/1969 | Griem, Jr. | 65/163 X |
| 3,726,656 | 4/1973 | Reid et al. | 65/3 A |

*Primary Examiner*—Arthur D. Kellogg
*Attorney, Agent, or Firm*—Sughrue, Rothwell, Mion, Zinn and Macpeak

[57] ABSTRACT

A method of producing clad glass rod of uniform diameter from which an optical fibre is drawn. The rate of drawing of the rod from a glass melt and the diameter of the drawn rod are sensed and the sensed values are fed to a coarse open loop control and a high gain closed loop control which regulate the draw speed of the rod and the movement of a cooling jacket which cools the rod as it is drawn.

8 Claims, 1 Drawing Figure

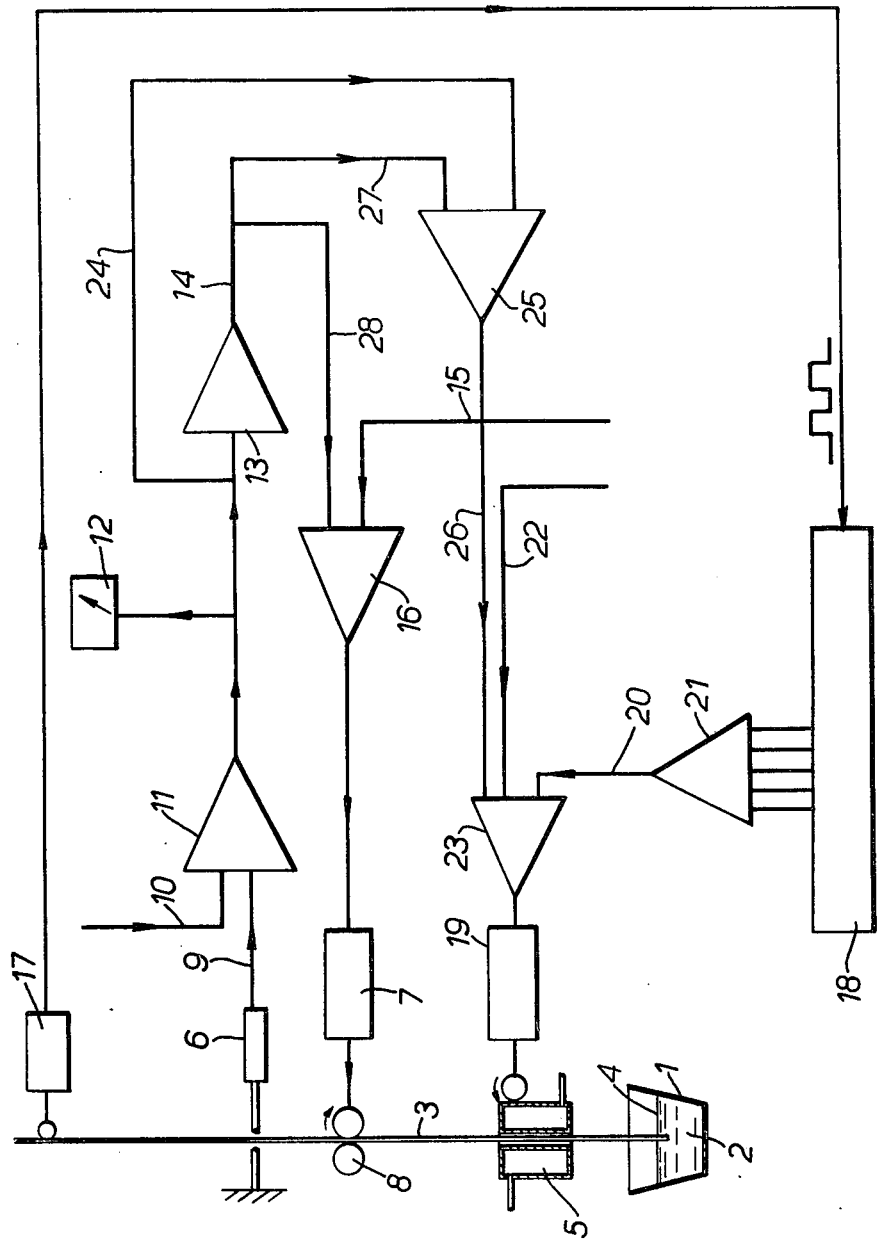

CONTROLLED METHOD FOR THE PRODUCTION OF CLAD GLASS ROD

BACKGROUND OF THE INVENTION

1. Field of the Invention

This invention relates to a method for the production of clad glass rod of substantially uniform diameter and to clad glass rod produced by such a method.

2. Description of the Prior Art

It is known that clad glass rod i.e., glass rod in which a core rod of glass has a coating or cladding of a second glass of different composition and optical properties to that of the core glass, can be redrawn into a clad fibre or use as an optical light guide in fibre optics.

In operating a process in which optical fibre is drawn from pre-formed clad glass rod, it is desirable to ensure that no contamination has occurred during manufacture of the clad rod, and that the rod is of a substantially uniform diameter.

Our U.S. Pat. No. 3,726,656, relates to a method of production of clad glass rod in which contamination at the interface between the core glass and the cladding glass is minimal, and required optical properties are achieved. An elongated clad glass member is produced by supporting within the same container a molten layer of a first glass on a molten layer of a second glass, the two layers being provided by two quiescent pools of glass, one overlying the other within the same container, drawing from the free surface of the upper layer an elongated member comprising an outer cladding of the first glass on a core of the second glass which is entrained at the interface between the layers, and stabilising the elongated member by cooling above the surface of the upper layer. A cooler, e.g. a water jacket, is preferably disposed as near as possible to the free surface of the glass to effect such cooling, so that the elongated member, i.e., the clad glass rod which is drawn upwardly is quickly set.

As well as the relative viscosities of the two glasses and the speed of upward drawing, other factors which control the overall diameter of the clad rod and the radial width of the cladding are the distance of the bottom of the cooler from the free surface of the upper layer of glass, and the intensity of cooling.

When operating a batch process for the production of clad glass rod, the level of molten glass in the reservoir or pot from which the rod is being drawn falls as the rod is formed, and it is consequently necessary to drive the cooling means down toward the molten glass as the glass level in the reservoir or pot falls.

It is an object of the present invention to provide a method of forming clad glass rod in which an improved control of diameter of the rod is effected during the drawing of the rod.

SUMMARY OF THE INVENTION

The invention provides a method of producing clad glass rod of substantially uniform diameter. The rod is drawn from a glass melt whilst sensing the rate of drawing and the diameter of the drawn rod. The sensed values are used to control the diameter of the drawn rod by regulating movement of a cooling means for cooling the drawn rod into solid form and by regulating the speed at which the rod is drawn from the glass melt.

The control of the diameter of the drawn rod may be achieved by using a two loop control system involving a coarse open loop control which senses the rate of drawing and regulates the movement of the cooling means and a high gain closed loop control which senses the diameter of the drawn rod and regulates the speed at which the rod is drawn from the glass melt.

The coarse open loop control may regulate the movement of the cooling means by driving it down towards the glass melt in synchronism with the change in level of the glass melt as the rod is drawn from the surface of the melt.

The high gain closed loop control may regulate the speed at which the rod is drawn from the glass melt by means of a signal which is related to the diameter of the drawn rod.

The speed of movement of the cooling means may be regulated to keep the speed at which the rod is drawn substantially constant. This regulation of the speed of movement of the cooling means is, preferably, by a proportional control loop in which a signal indicative of an error in the diameter of the rod is combined with a signal indicative of a change in the drawing speed.

The diameter of the drawn rod may be controlled to within ± 5% of the nominal diameter for rods of a diameter between 1.5 mm and 8 mm.

The invention also comprehends clad glass rod when drawn by the above method.

BRIEF DESCRIPTION OF THE DRAWING

An embodiment of the invention will now be described, by way of example, and with reference to the accompanying drawing, which shows a block diagram of a system for controlling the diameter of a clad glass rod during manufacture.

DESCRIPTION OF PREFERRED EMBODIMENTS

The system is designed to control a rod drawing machine which consists of a bowl 1, of molten glass 2, from which a rod 3 is drawn off, being then cooled to set it by means of a cooling jacket 5. Being a batch process, control parameters are time-dependent, i.e., the distance between the glass level 4 and the cooling jacket 5 increases as the bowl empties. A coarse open loop control is achieved by driving the cooling jacket 5 down towards the molten glass 2, in synchronism with the change in height of glass level 4.

This coarse control of the process allows a fine control of diameter to be applied using a high gain closed loop system. A linear displacement transducer 6 provides a signal proportional to the rod diameter which controls the speed of a rod drawing motor 7, and hence a roller drive 8 which draws the rod 3 upwardly.

The transducer 6, used to measure the rod diameter, is a Sangamo Weston L.V.D.T. with a stroke of 2.5 mm. The output 9 from this is compared with a pre-set voltage 10, both being fed to a differential amplifier 11. The difference is proportional to any change in the diameter of the rod, which is displayed on a centre zero meter 12 and fed into a proportional plus integral controller 13, the output 14 of which is fed via a line 28 to a summing amplifier 16 and controls the speed of the roller drive 8, via the motor 7.

The above constitutes a high gain closed loop system in which the speed at which the rod is drawn is regulated by a signal proportional to the diameter of the formed rod. A signal 15, from a manual control (not shown) can be fed with the output 14, via the summing amplifier 16, to the motor 7, to give the operator direct control of the drawing speed.

A digitiser 17 produces output pulses by means of a rotating disc with holes drilled around its circumference such that they interrupt light falling on a phototransistor. This disc is driven by the roller drive 8, which draws the glass up. The pulse repetition rate is proportional to the speed of the glass rod, and assuming a constant diameter, the rate of flow of glass from the bowl 1. The digitiser signal controls a digital curve generator 18, which counts the pulse arriving from the digitiser, and after a preset number advances the output voltage along a curve.

For convenience, the digitiser pulse train is counted down to one pulse per meter. The number of meters of rod to be drawn between steps can be pre-set.

Control of the upward and downward movement of the cooling jacket 5, is via drive 19, responsive to the output 20 of a differential amplifier 21 fed from the digital curve generator 18.

The above constitutes a coarse open loop control system which drives the cooling jacket down towards the molten glass in synchronism with the change in level of the molten glass in the bowl 1.

Again, a signal 22, from a manual control (not shown) can be fed with the output 20, via a summing amplifier 23, to the drive 19, to give the operator direct control of the jacket speed.

It is envisaged that the control system may be adapted so as to control the cooling jacket drive speed in such a manner that the rod drawing motor speed can be kept substantially constant.

This may be achieved either with a first system which takes the form of a proportional control loop, using the diameter error plus the consequential change in drawing speed to control the cooling jacket motor speed, e.g. if the diameter increases, the drawing motor will speed up, the increase in speed of the drawing motor will be monitored and used to slow down the speed of the cooling jacket motor, thus enabling the drawing motor ultimately to slow down to its initial speed, which is thus held substantially constant.

In the embodiment of the invention shown, the diameter error is fed to the summing amplifier 23 via a line 24, a summing amplifier 25 and a line 26. In practice it is found that the integral controller 13 can saturate, if the diameter error becomes too great and so the change in drawing speed then required is too high. To reduce the possibility of the integral controller 13 saturating, its output is fed via a line 27 to the summing amplifier 25, and hence via line 26 to the amplifier 23. In this way additional adjustment is made to the cooling jacket 5 which assists in reducing the diameter error and in maintaining the drawing speed substantially constant.

A second system is an override control which is energised when the change in drawing motor speed exceeds a fixed level (e.g. 2 rpm). The cooling jacket drive motor is run at maximum speed either in or out for a fixed time (e.g. 8 – 20 secs). After a delay corresponding to, say 0.3 – 2.3 meters of rod, the action is repeated until the change in drawing motor speed is reduced below the energisation level.

Using a control system as described above it is possible to produce clad glass rod using the method of the above mentioned U.S. Pat. No. 3,726,656, the disclosure of which is hereby incorporated by reference, with a substantially uniform diameter. A variation of ± 5% of the nominal diameter can be achieved with rods having a diameter in the range 1.5 mm to 8 mm.

Examples of glasses which may be used as core glass and cladding glass are given in the following Table:

| Constituent Oxides | Cladding Glass (Weight %) | Core Glass (Weight %) |
|---|---|---|
| $SiO_2$ | 56.45 | 45.03 |
| $PbO$ | 30.50 | 45.92 |
| $Na_2O$ | 3.90 | 2.52 |
| $K_2O$ | 8.40 | 6.29 |
| $Al_2O_3$ | 0.50 | — |
| $As_2O_3$ | 0.20 | 0.20 |
| $Sb_2O_3$ | — | 0.20 |

Such rods can subsequently be tested and drawn into optical fibre by the method of our co-pending United States Patent Application Serial No. 721,927, for "A method for the production of optical fibre", filed Sept. 9, 1976, the disclosure of which is hereby incorporated by reference.

We claim:

1. In a method of producing clad glass rod of substantially uniform diameter including the steps of:
   supporting within the same container a glass melt of a molten layer of a first glass on a molten layer of a second glass, said two layers being provided by two quiescent pools of glass, one overlying the other within said same container,
   drawing from the free surface of the upper layer a clad glass rod comprising an outer cladding of said first glass on a core of said second glass which is entrained at the interface between said layers,
   stabilizing said drawn clad glass rod by cooling said drawn glass layer by a cooling jacket which surrounds said drawn glass so as to cool said drawn glass into solid form above the surface of said upper layer, and
   varying the rate of drawing of said rod to generally control the diameter of the rod,
   the improvement comprising the steps of:
   sensing the rate of drawing and the diameter of the drawn rod, and
   moving the cooling jacket axially towards and away from the glass melt container in response to the rate of drawing and diameter sensing to render the drawn clad glass rod more uniform in diameter, particularly as the level of glass melt within the container varies.

2. A method according to claim 1, wherein control of the diameter of the drawn rod is achieved by using a two loop control system involving a coarse open loop control which senses the rate of drawing and regulates the movement of the cooling jacket and a high gain closed loop control which senses the diameter of the drawn rod and regulates the speed at which the rod is drawn from the glass melt.

3. A method according to claim 2, wherein the coarse open loop control regulates the movement of the cooling jacket by driving it down towards the glass melt in synchronism with the change in level of the glass melt as the rod is drawn from the surface of the melt.

4. A method according to claim 2, wherein the high gain closed loop control regulates the speed at which the rod is drawn from the glass melt by means of a signal which is related to the diameter of the drawn rod.

5. A method according to claim 3, wherein the high gain closed loop control regulates the speed at which the rod is drawn from the glass melt by means of a signal which is related to the diameter of the drawn rod.

6. A method according to claim 1, wherein the speed of movement of the cooling jacket is regulated to keep the speed at which the rod is drawn substantially constant.

7. A method according to claim 6, wherein the regulation of the speed of movement of the cooling jacket is by a proportional control loop in which a signal indicative of an error in the diameter of the rod is combined with a signal indicative of a change in the drawing speed.

8. A method according to claim 1, wherein the diameter of the drawn rod is controlled to within ± 5% of the nominal diameter for rods of a diameter between 1.5 mm and 8 mm.

* * * * *